US 8,761,746 B2

(12) United States Patent
Armstrong et al.

(10) Patent No.: US 8,761,746 B2
(45) Date of Patent: Jun. 24, 2014

(54) EXTENDED CASCADED RINGING

(75) Inventors: Kenneth Armstrong, Woodlawn (CA);
 David Adam Smith, Ottawa (CA);
 Ralph Anzarouth, Ottawa (CA); Steve Lyon, Woodlawn (CA); Thomas A Gray, Fort Coulonge (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1061 days.

(21) Appl. No.: 12/798,978

(22) Filed: Apr. 15, 2010

(65) Prior Publication Data

US 2010/0267374 A1 Oct. 21, 2010

Related U.S. Application Data

(60) Provisional application No. 61/212,829, filed on Apr. 16, 2009.

(51) Int. Cl.
 *H04M 3/42* (2006.01)
(52) U.S. Cl.
 USPC ... 455/417; 455/450; 455/456.1; 379/211.01; 379/211.03
(58) Field of Classification Search
 USPC ............ 455/417, 415, 445, 456.1–456.6; 379/211.01, 211.02, 211.03, 211.04, 379/211.05
 See application file for complete search history.

(56) References Cited

U.S. PATENT DOCUMENTS

| 5,329,578 | A | 7/1994 | Brennan et al. |
| 5,905,789 | A | 5/1999 | Will |
| 6,130,938 | A | 10/2000 | Erb |
| 6,160,877 | A | 12/2000 | Tatchell et al. |
| 7,415,104 | B2 | 8/2008 | Gray et al. |
| 2002/0146103 | A1 | 10/2002 | Holt et al. |
| 2005/0100157 | A1* | 5/2005 | Gray et al. ............... 379/265.01 |
| 2007/0047522 | A1* | 3/2007 | Jefferson et al. ............ 370/352 |
| 2008/0095350 | A1* | 4/2008 | Holt et al. ................ 379/211.02 |
| 2009/0319595 | A1* | 12/2009 | Millmore et al. ............ 709/201 |
| 2010/0046731 | A1* | 2/2010 | Gisby et al. ............. 379/211.01 |
| 2010/0228780 | A1* | 9/2010 | Yap et al. ...................... 707/784 |

FOREIGN PATENT DOCUMENTS

| EP | 1087628 A2 | 3/2001 |
| EP | 1521440 A1 | 4/2005 |

* cited by examiner

*Primary Examiner* — Lester Kincaid
*Assistant Examiner* — Dung Lam

(57) ABSTRACT

A system and method for routing selected phone calls to a user having a plurality of communication resources is disclosed. Background information of a caller is identified. A context of the user is postulated based on available information. The user's communication resources are identified. A location of the user is estimated. A cascaded ringing program for routing the phone call to the user is identified based on the background information of the caller, the device type of the user's communication resources, the postulated context of the user, and the estimated location of the user. The phone call is then routed using the cascaded ringing program.

18 Claims, 4 Drawing Sheets

EXTENDED CASCADED RINGING

CROSS-REFERENCE TO RELATED APPLICATIONS AND CLAIM OF PRIORITY

This application claims the benefit of U.S. Provisional patent application Ser. No. 61/212,829 filed on Apr. 16, 2009, which is incorporated herein by reference.

BACKGROUND

A revolution in communications in the $21^{st}$ century has enabled people to communicate like never before. Many people in developed countries often have three or more communications means available at any one time, such as the use of a business phone, cell phone, email, instant messaging, social media, and so forth. With the continued improvement in wireless communication and smart phones, these communications means are available more often, such as when a person is not at his or her desk.

However, despite the many ways in which people can communicate, it can still be difficult to contact a person or be available for contact from a specific person or entity. Without the expense of a personal secretary to forward calls or information, a person can miss important calls or be otherwise unreachable for extended periods of time as the person moves about in the normal conduct of his or her job. The delays caused by the inability to communicate can be expensive and time consuming.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
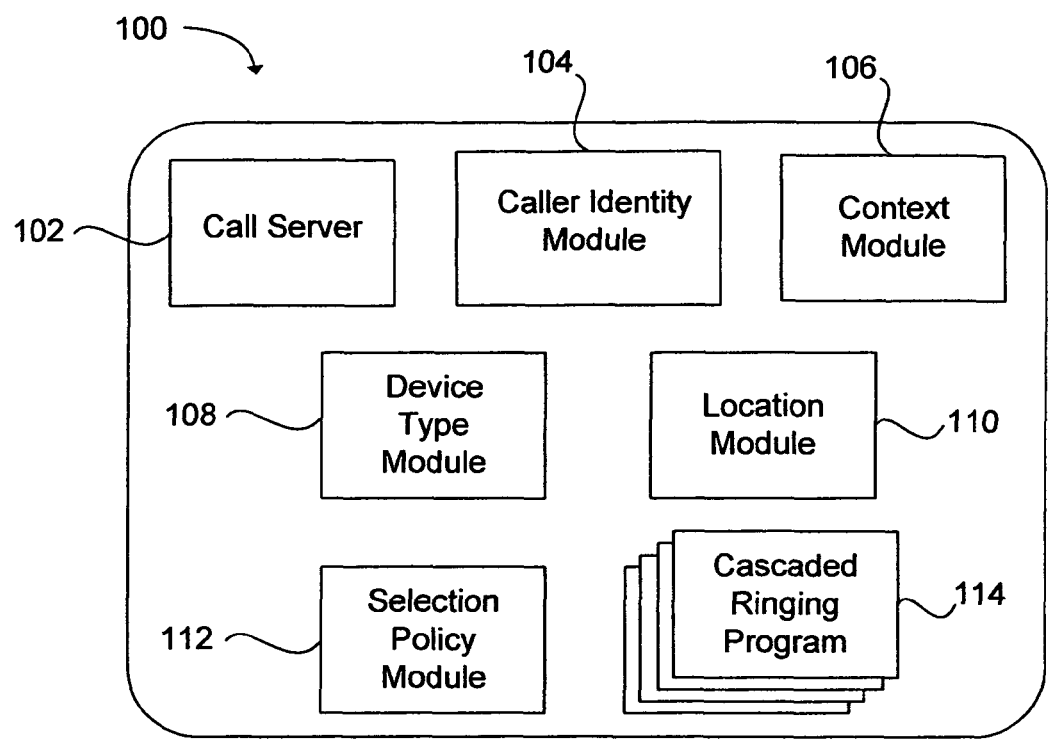
FIG. 1 illustrates a block diagram of an example system for routing selected phone calls to a user having a plurality of communication resources in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

EXAMPLE EMBODIMENTS

Various attempts have been made to allow telephone calls to be forwarded as a person moves about. For example, simple call forwarding can be used to forward calls from a business phone to a person's cell phone if he or she leaves their desk. Find Me Follow Me (FMFM) type systems enable a person to enter multiple phone numbers, such as work, cell, and home numbers. If the person is not at the first location, such as work, then additional phone numbers are tried. The previous location of the person may be known based on the last phone call answered. Contextual systems have been developed that route calls so that routing is consistent with the current priorities of a user. However, contingencies may arise at the time of call routing for which the contextual and FMFM systems are unaware. For example, the user may have just stepped away from the location in which the FMFM system assumed the person was located. In addition, the systems described above fail to make use of modern communication means such as email, instant messaging, and social networking. These limitations reduce the usefulness of systems that have been designed to enable a user to receive a phone call irrespective of the user's location and communication means.

FIG. 1 shows one example embodiment for a system 100 for routing selected phone calls to a user having a plurality of communication resources. The system can enable both contextual and location based tracking of a user to enable a phone call to be routed to the user. In addition, the system can take advantage of modern communication conveniences. For example, a person in a meeting may not want to be interrupted by a phone call. However, the person may also want to know if they receive a call from an important person, such as a boss or client. A text message can be sent to the person's phone that enables them to discretely learn of the phone call and then to make an educated decision on whether to take the phone call.

The system 100 includes a call server 102 that is configured to obtain identity information for a phone call received at the call server. For example, the call server can obtain caller identification information (caller ID), also referred to as call display. The caller ID may be in the single data message format (SDMF) or multi data message format (MDMF). The call server may also receive automatic number identification information, or another type of information to enable telephone number and/or identification of the caller to be discovered. The call server can be a Private Branch Exchange (PBX) server, an internet protocol (IP) call server, or another type of server configured to receive and route telephonic information.

The system 100 further comprises a caller identity module 104. The caller identity module is in communication with the call server 102. The call server can communicate the identity information for the phone call to the caller identity module. The caller identity module contains contact information associated with a business's clients, customers, employees, acquaintances, and other desired associates. The contact information can include background information for the caller, including the person's name, employer, title, phone numbers, email address, and so forth. The identity information can be matched with a specific person's contact information. For example, a phone number obtained at the call server from the caller ID can be matched with a contact file and associated with a specific person. Selected background information for the caller can then be used to route his or her phone call as needed. This will be discussed more fully below.

The system includes a context module 106 configured to postulate a context in which the phone call will be received by the user. The context is postulated based on available user context information. For example, the context module can be in communication with a calendar server such as a Microsoft Exchange™ server. By accessing the calendar information in the Microsoft Exchange server, a location of the user (i.e. the person to whom the phone call was made) can be determined. The status of the user may also be determined. If the user indicates that he or she is in a meeting, that information can be taken into account. Additional information can also be used, such as whether the user is out of the office, or not available to communicate. If the person is in a meeting, the location of the meeting may be available in the calendar information. For example, a specific conference room may be listed or reserved. The context information can be used to determine how to route the phone call from the caller to the user. Additional details related to the use of context information are provided in U.S. Pat. No. 7,415,104, which is hereby incorporated by reference.

The context information from the context module 106 can be used in conjunction with the background information from the caller identity module 104. For example, if the caller is determined to be the user's boss, or an important client of the user, then this information can be used to route the call to the user even if the context module lists the user as busy or in a meeting.

The system 100 further includes a device type module 108. The device type module is configured to store the device type and contact protocol for each of the user's plurality of communication resources on which the user wants the phone call routed. This information may be input by the user through a graphical user interface. For example, the user may enter his business phone number, cell phone number, and home phone number. The business and home phones can be listed as stationary phones, while the cell phone can be listed as a mobile phone. This information can be used in conjunction with the context information. For example, the context module may determine that the user is out of the workplace on a meeting based on information obtained from the user's calendar. Therefore, using the device type module, a mobile device can be selected to route the phone call to.

Additional device types that can be listed in the device type module 108 include an assistant's phone number, a coworker phone number, an external hot desk connection, a voice mail box, an email account, one or more instant messaging accounts, and one or more social networking accounts. The graphical user interface may be configured to automatically identify the contact protocol needed to route the phone call, or information associated with the phone call. For example, whether the phone is connected to a voice over internet protocol (VOIP) router, the public switched telephone network (PSTN), or can be communicated with via hyper text transfer protocol (HTTP), such as the email account, instant messaging accounts, social networking accounts, and the like. Additional information regarding the use of information from the device type module and the context module will be discussed below.

A location module 110 can also be included in the system 100. The location module is configured to determine an estimated location of the user based on previous use of the user's plurality of communication resources. For example, the call server 102 can be in communication with various communication resources of the user. The call server can be in communication with the user's work phone as well as other phones in the place of business. The user may be logged in to another phone through an external hot desk connection. The call server may also be connected to the user's cell phone, especially if it is provided by the user's company.

In certain instances, the user's home phone may even be connected to the call server 102. The location of the user, or the most likely communication resource with which the user may respond with, can be tracked by the location module 110. For instance, if the user last used his or her cell phone, it is likely that the user is away from his or her desk and most likely to answer the cell phone again. If the user last used a selected hot desk phone at a different location within the company, the hot desk connection may be the most likely place to attempt to connect with the user again. This information can be used in conjunction with the information available from the other modules discussed above to route the phone call to the desired location.

The system 100 can include a selection policy module 112. The selection policy module is configured to select a cascaded ringing program 114 for routing the phone call to at least one of the user's plurality of communication resources. A cascaded ringing program is selected based on the identity information of the caller, the available background information of the caller, the device type of the user's communication resources, the postulated context of the user, and the estimated location of the user. A plurality of different types of cascaded ringing programs can be created, modified, and/or or employed by a user. The selection policy module can select the appropriate cascaded ringing program based on the inputs from the other modules, as described above.

While a plurality of modules are shown in FIG. 1, it should not be assumed that each of the modules are required for the operation of a system for routing selected phone calls to a user having a plurality of communication resources. The actual number of modules used in routing a selected phone call is dependent on the design criteria of the system and the needs of the user.

Figure 2:
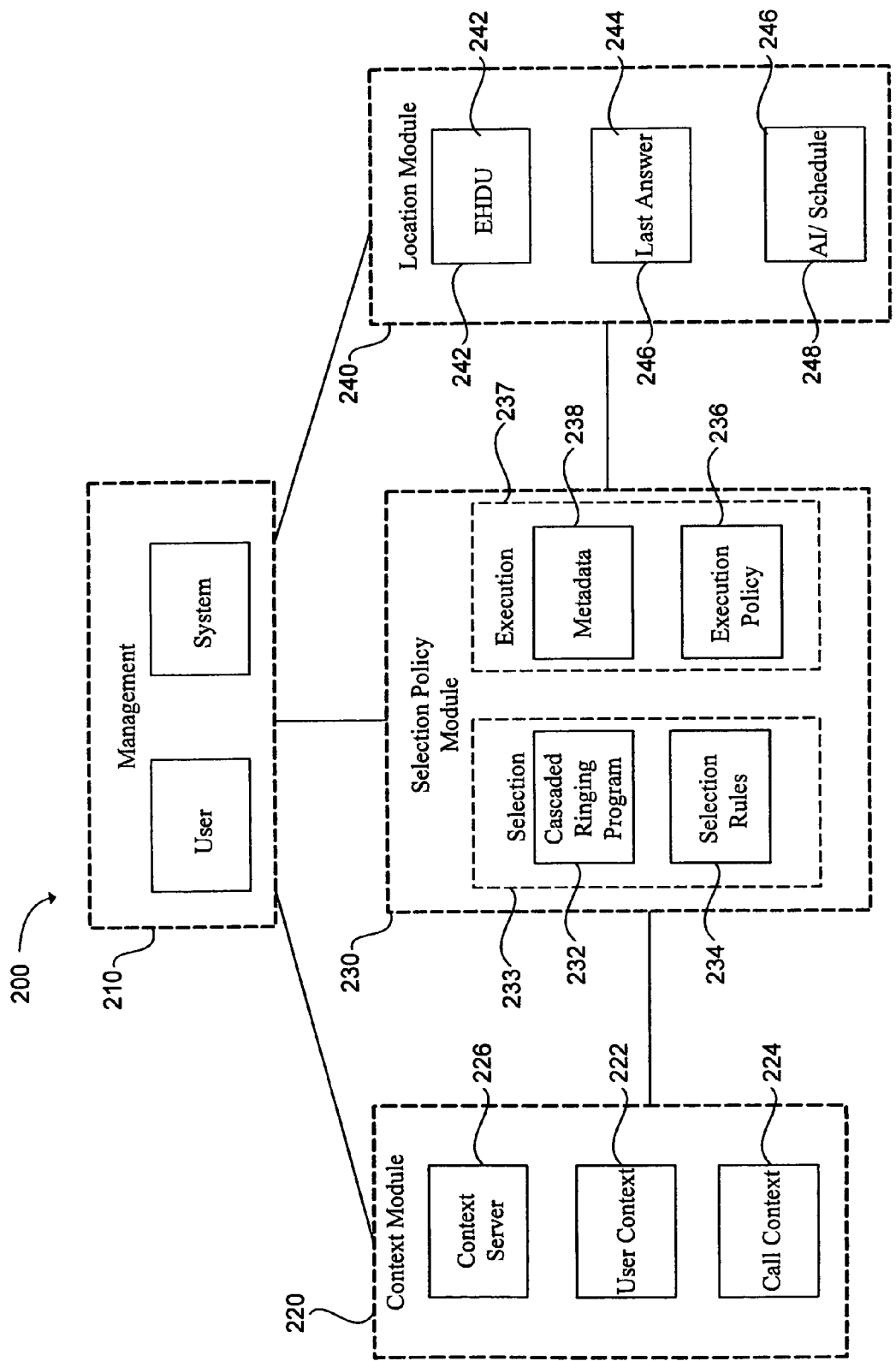
FIG. 2 illustrates a block diagram of an example system for routing selected phone calls to a user having a plurality of communication resources in accordance with an alternative embodiment of the present invention.

FIG. 2 shows a system 200 for routing selected phone calls to a user having a plurality of communication resources. The system 200 is shown as an alternative layout of the system 100 of FIG. 1. While the layout of the system 200 is illustrated in a different manner than the system 100 of FIG. 1, the differences are provided for purposes of discussion. The two systems are intended to have the same functionality and use.

The exemplary system 200 is illustrated in four main blocks, referred to herein as modules. A management module 210 enables a user or system supervisor to set up and control the system. A context module 220 provides context awareness of both the caller and the user. A location module 240 is used to determine a location of the user at the time a call is received.

A selection policy module 230 provides selection policies based on metadata, policy data, and input from the management 210, context 220, and location 240 modules. A more detailed description of the elements of the system 200 will follow.

The context module 220 includes a user context module 222 and a call context module 224. As previously discussed, the user context module can be connected to a computer server. In this example embodiment, the server is referred to as a context server 226. The context server is a server, or group of servers that enable contextual information for the user to be obtained in near real time. For example, contextual information for the user can be obtained in near real time from a calendar server. The calendar server may operate on the context server. In one embodiment, the context server can operate multiple separate server applications through the use of virtualization.

The call context module 224 functions similarly to the caller identity module in FIG. 1. The call context module can be in communication with a call server. The call server may be located on the context server 226 or may operate as a separate server. The call server can communicate the identity information for the phone call to the caller identity module. The call context module contains contact information associated with a business's clients, customers, employees, acquaintances, and other desired associates. The contact information can include background information for the caller, including the person's name, employer, title, phone numbers, email address, and so forth. The identity information can be matched with a specific person's context information. For example, a phone number obtained at the call server from the caller ID can be matched with a contact file and associated with a specific person. Selected background information for the caller can then be used to route his or her phone call as needed. This will be discussed more fully below.

Using the information obtained by the user context module 222 from the user's calendar and schedule, the user's location and likely co-presence may be determined. For an incoming call, the user context module can provide the information necessary to determine the ability of a user to answer a phone call based on the user's context. The information obtained by the call context module can be used to determine who a call is from. This information can then be linked to an expanded information set. For example, caller ID information sent from the call server to the user context module can identify the phone number of the call as (613) 592-2122. The user context module can determine that this is a call from Ann Rowe's directory number and that Ann Rowe is the user's boss. This information can be made available to the selection policy module 230. The assemblage of assertions will describe the call and allow policy selection within the caller selection module to determine proper call handling.

The location module 240 is used to determine the current location of the user. Various techniques may be used. For example, the location of the user's external hot desk (EHDU) assignment can be obtained from the EHDU module 242. The location where the user last answered or originated a call may be obtained from the last answer module 244. In addition, the user's schedule can provide an estimate of the user's current location from the schedule module 246. This information may also be obtained from the user context module 222 in the context module 220. The outputs from these modules can be specified in ringing programs by the use of reserved values for location. The values 'ehdu', 'last' and 'schedule' can be used to designate the source from which location data can be obtained. Moreover, the location module can be used to combine all estimates into one that is most likely and supply the estimate as well. The value 'likely' can be used to describe a combined estimate of the user's location.

The selection policy module 230 is divided into two sections, a selection group 233 and an execution group 237. The selection group is comprised of the cascaded ringing program module 232 and the selection rules module 234. The execution group is comprised of the metadata module 238 and the execution policy module 236.

The cascaded ringing program module 232 can include one or more cascaded ringing programs. Each cascaded ringing program can include a combination of serial and parallel forking. For instance, a sequence of parallel forks can be initiated in sequence. Each of these forks includes a selection of one or more of the user's plurality of communication resources. Each fork can include an attempt to reach the user in a different way. The different attempts to reach the user may be more or less appropriate to the goal of connecting the user to the phone call, while taking into account the user's current context. The sequence of these forks is designed to deal with the postulated context of the user and other contingencies that may be occurring at the time of the phone call.

For example, if a call comes in that is of such importance that it should be dealt with by a person and should not be left for voicemail, and the user is not currently interruptible (i.e., the user is engaged in a meeting with an important client), the call may be initially directed to the user's personal assistant. If that attempt is unsuccessful, then the call can be sent to one or more of the user's coworkers. If no coworkers are able to answer the phone call then the call may be sent to the user. For instance, a text message, instant message, or email may be sent to the user that identifies the caller and provides information about the caller. The user can then determine whether he would like to be excused from his or her meeting to take the call. If the user chooses not to take the call, the phone call may be sent to the user's voice mail. The system is able to adapt to current contingencies to direct the phone call with guidance from the user context.

The selection rules module 234 contains rules that can link the call in context to the most appropriate ringing program. Individual rules may be selected by the user to identify the desired ringing program for various different user contexts. Alternatively, predetermined sets of rules may be selected and applied based on the context of the user. For example, a user may define a rule such as: "for calls from customers while I am in a meeting, use Ringing Program 1; for calls from my boss while I am in a meeting, use Ringing Program 2; for calls from client X always use Ringing Program 3 no matter the context." The rules may be applied to groups of people, such as customers, or to individual people, such client X. The rules may be stored in the selection policy module 230. This may be most effective for applying a rule to sets of people. Alternatively, a rule for a particular client may be stored with the background information for the particular client, such as in the call context module 224. If no particular rules are selected for a caller, then the generic rules in the selection policy module may be applied.

The metadata module 238 in the execution module 237 can store information that can be accessed by the cascaded ringing programs module 232. For instance, the plurality of communication resources associated with a user can be listed in the metadata module. The cascaded ringing program module can indicate a selection of resources. Each resource's address, such as the resource's directory number, URL address, or other type of address can be stored in the metadata module. The metadata module can also include information related to the protocol through which a selected communication resource is operated. The metadata module can also include additional variables, such as whether the resource is fixed or mobile, local to the business or located remotely, whether the expected operator of the device is human, robot, the user, an assistant, and so forth. Additional aspects of the metadata module will be explained below.

The ability to store information related to the user's communication resources in the metadata module 238 enables ringing programs to be formed that are independent of the user's particular communication resources. This enables ringing programs to be created that can be used by a variety of people. The ability to create generic ringing programs enhances the usefulness of the system. While people generally like to be more productive, they are often hesitant to spend the time necessary to create the individual rules needed to select a proper ringing program. By using the separate metadata, generic ringing programs can be used by people, and then modified to fit their specific needs. In addition, as the user's communication resources change, such as when a new cell phone is purchased or the user moves offices or changes an office phone, the device list and other metadata information can be easily updated without requiring extensive changes to the ringing programs.

Metadata Table

Data in the metadata module 238 can be stored in a database, table or similar structure. Each desired user of a phone system can be provided with a separate table. Information relating to the user's plurality of communication resources can be listed in the user's table. In one embodiment, the metadata can be stored in an XML document with the metadata for each resource being contained within an XML element. Each of these elements may have a number of attributes that can take two or more values. The properties described in the metadata can indicate the user's resource capabilities in a Session Initiation Protocol (SIP). Various attributes of the metadata that can be included in the table are listed below. The list is not intended to be a complete list of all possible metadata attributes, but merely an exemplary list of selected attributes of the user's communication resources.

Address—this is the network address of a communication resource. The address can be a directory number, such as a phone number. Alternatively, the address may be a Uniform Resource Locator (URL) address, a SIP address, an Instant Messaging address, an email address, a link to the user's social networking sites, and so forth.

Protocol—the protocol attribute can describe the protocol used to communicate with the listed communication resource. For example, the protocol may be based on the Public Switched Telephone Network (PSTN), SIP, SIP for Instant Messaging and Presence Leveraging Extensions (SIMPLE), Extensible Messaging and Presence Protocol (EMPP), Simple Mail Transfer Protocol (SMTP), and so forth.

Mobility—the mobility attribute can have two values including: local and remote. The values indicate whether or not the device is suited for local service or can be used external to a building or location.

Class—the class attribute can have values including business and personal. A user may not want to route certain work related calls to a personal communication resource. Alternatively, if it is an important call, from a top client or a boss, then the call may be routed to the user's personal communication resource, such as a home phone or personal cell phone.

Actor—the actor attribute can include various values to identify the relationship of the caller with the user: principal, attendant, message taker, colleague, boss, information, and text. Principal indicates a device associated with a human user. Attendant is a device or human that can assist in contacting the human user. For instance, the attendant may be the user's secretary, who can assist the user in regaining contact with the user. Message taker is a person or device which can accept messages on behalf of the human user. The user voice mail box is an example of this. Information refers to a device that can provide information about the human user. In one example, the information device may supply information about when the user may be available based on the context obtained from the user's calendar, and other resources. Text refers to a text device that can receive text. For instance, information from the call context module 224 in the context module 220 may be sent one or more of the user's communication resources that are configured to receive text, such as a text message on the user's cell phone, or via the user's email, instant messaging, or social networking sites.

Shared—the shared attribute can include two values: yes, and no. Some of the user's communication resources are shared by other humans and devices. An example of this is a residence telephone that can be shared by humans and devices such as fax machines. The cascaded ringing programs 232 and execution policies 236 can include an element called "one-busy-all-busy". In an attempt to find the user, if one of his or her communication resources is in use, then it is an indication that the user is on a call and is not reachable. The current fork in the ringing program can terminate in this case so that time is not wasted by routing calls to devices that the user will not answer. However, for shared resources, this may not be the case. A person other than the user may be using the resource. So the shared attribute can be used to differentiate between personal communication resources and shared resources to enable the one-busy-all-busy capability.

Location—many of the user's communication resources may be present in the same location. For example, a user's cell phone and desk phone will be in the same location when the user is at his or her desk. In addition, some resources may receive multiple types of communication, such as a mobile phone that can receive calls from a cellular station and via a local wireless connection such as an IEEE 802.11 connection. The same device may also receive texts, email and instant messaging. Forwarding the phone call to each of these resources simultaneously would be superfluous and annoying to the user. Therefore, it is important to determine the location of each of the user's communication resources to reduce the probability that the phone call is simultaneously directed to multiple resources simultaneously.

The location attribute is used to provide an indication of the resource's location. For portable resources, a location of "user" may be assigned. It can be assumed that a portable resource, such as a cell phone, will be carried by the user. In instances where the use location can be determined, only devices at the user location need to be activated. A ringing program 232 can be selected by the selection rules module 234 that can select the appropriate resource and communication format to forward the phone call to the user. For instance, if the user is in a meeting, a text message may be sent identifying the caller if the caller is deemed sufficiently important to interrupt the meeting. Alternatively, if the meeting is in-house, the call may be directed to a wired phone that is located in the conference room rather than using the user's cell phone minutes. A wide number of choices may be selected by the user, or a programmer, in creating the selection rules used to select a ringing program. These choices can be updated by the user based on the user's desires and experiences.

Location Suppress—the location attribute is used to ensure that multiple resources in the same location are not all activated concurrently. However, certain users may want specific communication resources to be activated regardless of their location. For example, a user may want the phone call to be directed to his desk telephone regardless of how many of the user's communication resources are present in the room. If the "location suppress" attribute is set to a value of "yes" then the device will be activated regardless of the number of other communication resources to which the phone call is routed. If the attribute for each device at a selected location is set to "no" or another value aside from "yes" then the phone call will be routed only to a single device that is present at that location.

Suppress—the user may wish to not be contacted on certain communication resources for any reason. For example, the user may wish to not be contacted on his cell phone for a certain period of time. This may be accomplished by setting the "suppress" attribute for the cell phone to "yes". If the attribute is set to "yes", then the phone call will not be routed to the cell phone. If the resource is text based, such as texting, email, instant messaging, or social networking, then no information pertaining to the phone call will be sent to the resource while the suppress attribute is set to yes.

Selection Policy

The selection rules module 234 includes selection policies that examine the contextual information provided by the context module 220. The selection rules module 234 contains rules used to select a desired ringing program. The rules may be generic or specific. For example, a generic rule may be that if the user is in his or her office then ringing program 1 should be used. Ringing program 1 may be set up to route the phone call first to the desk phone, then to the receptionist, then to voice mail. If the user is in a meeting with a client in his or her office, then ringing program 2 should be used. Ringing program 2 may route the phone call first to a receptionist, then to a coworker, then send a text message to the user identifying the caller, and then to the user's voice mail after a predetermined period. Multiple rules may also be combined. For example, if the caller is identified as a priority caller, such as the user's boss or a top client, then ringing program 1 may be used even if the user is in a meeting.

Where rules have conflicts, a conflict mechanism can be used to select one of the rules for implementation. For example, if a call is received from a priority caller, but the user has activated the "suppress" attribute for his desk phone because he is in an important meeting in his office, then the conflict mechanism can be used. The conflict mechanism may rely on a value. For example, the suppress attribute may have a priority level indicator that can be selected by the user. For example, anything below a priority level 8 can be suppressed. Only a few of the user's contacts are listed as having a priority of 8 or higher. Only calls from those contacts will be allowed to be routed to the user's suppressed communication resources. If multiple rules have the same priority or specificity, then the previous rule selection may be used. If this does not select a single rule, then a random rule selection may be made.

The examples are not intended to provide a complete set of rules. Rules can be selected and established based on the needs of the user. Users with unique needs can set up unique rules to select desired ringing programs based on those needs.

Ringing Program

One or more ringing programs can be supplied to deal with the types of calls that a user typically receives. The ringing programs can describe a sequence of serial actions with embedded parallel forks. That is, the ringing program will describe how groups of communication resources will be activated sequentially. The ringing program may be configured in any type of format. For example, the ringing program may be formed as a declarative XML format. Other popular formats include Java, HTML, and C. Examples of elements and sub-elements of a ringing program will be described below.

In one embodiment, each ringing program can be delimited by a program element. This element can have a name attribute that is used to identify individual ringing programs for selection. Each individual fork within a ringing program can be delimited by a fork element. A fork element is a program that is run to route the phone call to one or more of the user's communication resources. A timeout attribute can be set to provide a maximum amount of time that the ringing program will remain in the fork element. For example, a fork element that includes routing the phone call to the user's desk phone may last for 5 seconds. If the phone call isn't answered within the five second period then the program will move on to the next fork.

The timeout attributes used at each fork element enable a ringing program containing multiple forks to be limited to a reasonable period of time. For example, a typical caller may be willing to remain on a phone call for up to 30 seconds while being connected to the user. Each fork in the ringing program can simultaneously route the phone call, or information related to the phone call, for an average time period of 7 seconds. Some forks may be substantially instantaneous, such as when a text message is sent. Other forks may last 15 or more seconds, such as when the call is routed to one or more of the user's coworkers to give them time to answer the phone call. By simultaneously routing the phone call to multiple communication resources, the length of time in which the caller is on the phone can be kept to a reasonable length of time. This length of time is typically within 20-60 seconds, though there may be cases when longer time periods are reasonable.

As previously discussed, selected communication resources, such as the user's desk phone and the user's cell phone may be used exclusively by the user. These resources can be identified in the metadata module 238 with an "Actor" attribute set to "principal" and a "Shared" attribute set to "no". If any of the resources that are identified as being exclusively used by the user are in use, then this is an indication that the user is currently busy. When this is determined, then it may be desired to terminate attempts to route the phone call to selected resources, since this can be distracting to both the user and others.

In another embodiment, routing of the phone call may be suppressed to all resources but the resource determined to be in use by the user. In such a case, the user can be presented with a call waiting indication on the device in use. The user can then choose to take the incoming call. An indication for suppressing the routing of the phone call, or information relating to the phone call, to all of the user's resources is the "One Busy All Busy" attribute set in the cascaded ringing program 232. One Busy All Busy is an attribute of the fork element in the ringing program. It indicates that the fork elements should be skipped if any one of the indicated resources is busy. So it applies to a single fork in a ringing program. If this attribute is set with the value of "no" then no suppression actions will be taken if an exclusively used communication resource is in use.

A location element describes the user's communication resources to which the phone call can be directed in a selected fork. The communication resources may either be described explicitly or indirectly through the metadata module 238. Various attributes can be used with the location element. Example attributes that can be used are described below.

An address attribute can be sent to the location element to provide a communication address of a communication resource. The address may be a URL address, a directory number, an email address, and so forth. A value of "self" can be applied to indicate that the resource is the users and that it is described in metadata. The address can either be for one of the user's communication resources or for a resource of another use whom the user whishes to be involved in selected calls. Special values may also be reserved for outputs of the location module 240.

The location module 240 is used to identify the current location of the user. Values can be selected as "ehdu", referring to the current hot desk location of the user, "last", referring to the location from which the user last answered or originated a phone call, "schedule", referring to the location at which the user's calendar or scheduling software places him or her, and "likely", referring to an estimate that combines the estimates of the above techniques into the most likely location the user may be.

A protocol attribute can be sent to the location element that comprises a metadata descriptor that indicates the protocol or type of application that the communication resource supports, as previously discussed.

An end attribute can be sent to the location element. The end attribute indicates how a connection should be handled. Its primary use will be the provision of announcements to synchronous communication resources. The end attribute can have two values—immediate and controlled. The "immediate" value indicates that the media connection should be dropped immediately after an announcement is made. The "controlled" value indicates that the connection should be maintained until the user indicates that it should be dropped. If the attribute is not specified then the default value of controlled is assumed.

An announce attribute can be sent to the location element. The announce attribute describes an announcement that can be provided over the communication resource immediately after the connection to the resource is set up. The announcement can be used to provide an indication of aspects (importance, caller identity, etc.). The announcement can be used to provide information to the user about the phone call and its progress. It can also be used to log contextual information about received calls. A "mail merge" type capability can be provided so that information can be extracted from the generated contextual information about a phone call and presented to the user. The announcement can be described in text. The technique by which the announcement is sent to the communication resource is dependant on the media and capabilities of the endpoint. For a PSTN connection, a text to speech converter may be provided to allow the announcement to be sent as speech. For a telephone that includes a display, the announcement may be presented in text on the display. For example, the announcement may be sent in the form of a text message. The announcement may also be sent as an email, instant message, through social networking, and so forth.

An on-entrance sub-element can provide an indication of actions that can be taken before the main actions of a fork are taken. The on-entrance sub-element can provide an announcement to a human or a log of the implications of the entrance to a fork. For example, the announcement can indicate the relevance of a call to a user so as to inform the user's decision as to whether to accept the phone call or not. The on-entrance sub-element can contain one or more Location elements to indicate which devices will be alerted.

An on-exit sub-element can provide an indication of actions that may occur upon the expiration of a fork. The on-exit sub-element can provide an announcement to a human or a log indicating the implications that a fork has expired. For example, the announcement may indicate that an important call has been missed. The on-exit sub-element can contain one or more location elements to indicate which of the user's communication resources will be alerted.

Example

An example implementation of a ringing program used in routing selected phone calls to a user having a plurality of communication resources is provided below. The ringing program comprises three cascaded forks. The first fork includes an announcement on entrance that indicates that this is an important call. This announcement is sent to the user's instant messaging client. If the user does not answer the call, the on-exit element causes a log to be created recording that the call wasn't answered. The fork will send calls to all of the user's devices with fixed mobility. This can be the user's desk phone and his or her residence phone.

The second fork will trigger if the user does not answer. The phone call will then be routed to the user's colleague (Ann Rowe). The call will be announced with an explanation.

The third fork will trigger if the colleague cannot take the call. The user's communication resources are described in metadata. The Msg_taker can take voice messages. For example, the Msg_taker may be the user's voicemail system. An attendant is a human that can take messages for the user and may be the user's receptionist or personal assistant.

```
=========================
<program name = "example 1>
<fork timeout = "10" one_busy_all_busy= "yes">
<on_entrance>
<location url="self" protocol = "IM" "announce = "Very important call from [Caller_Name]" End = "immediate"
</location>
</on_entrance>
<on_exit>
<location url="self" protocol = "log" "announce = "Very important call from [Caller_Name] missed" End = "immediate"
<on_exit>
<main>
<location url="self" actor = "principal" mobility = "fixed"
</location>
</main
</fork>
<fork timeout = 10>
<main>
<location url="sip:Ann_Rowe@example.com" protocol = "sip" announce= "Amanda missed a call from {Caller_Name]. Please take it?" End="controlled"
</location>
</main>
</fork>
<fork timeout = 250>
<main>
<location url="self" actor = "msg_taker"></location>
<location url="self" actor = "attendant"> </location>
</main>
</fork>
</program>
=========================
```

Execution Policy

Figure 3:
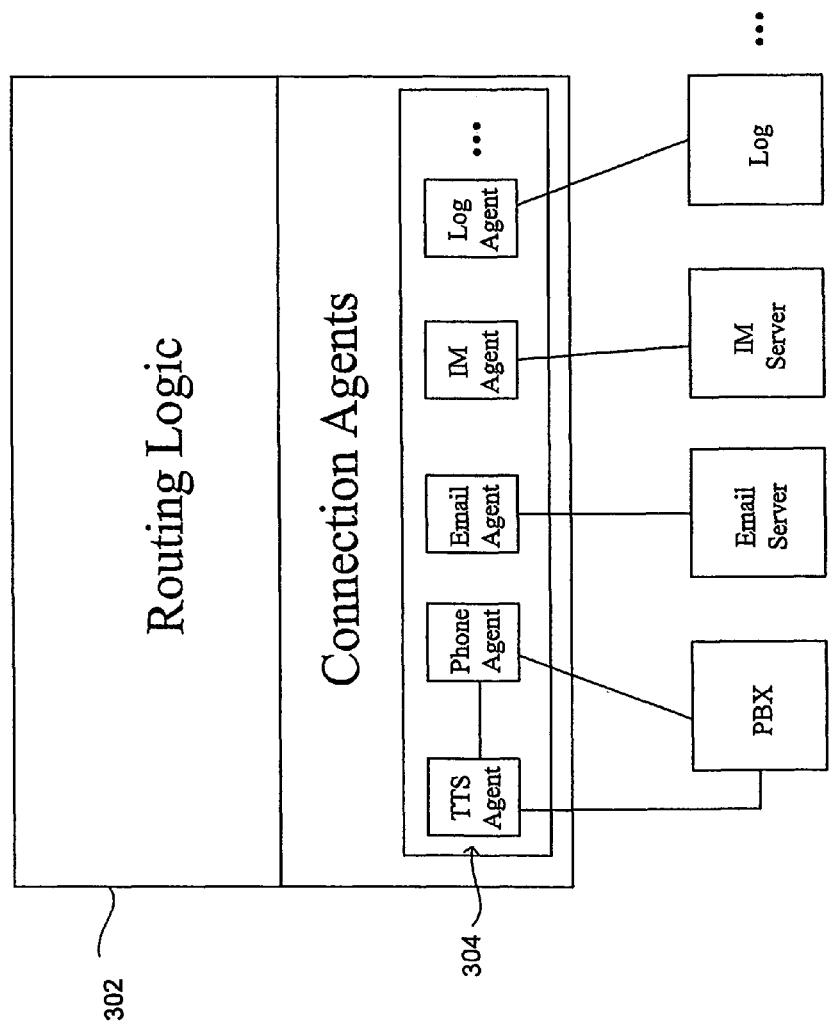
FIG. 3 illustrates a block diagram for an execution policy of the systems of FIGS. 1 and 2 in accordance with an embodiment of the present invention.
Figure 4:
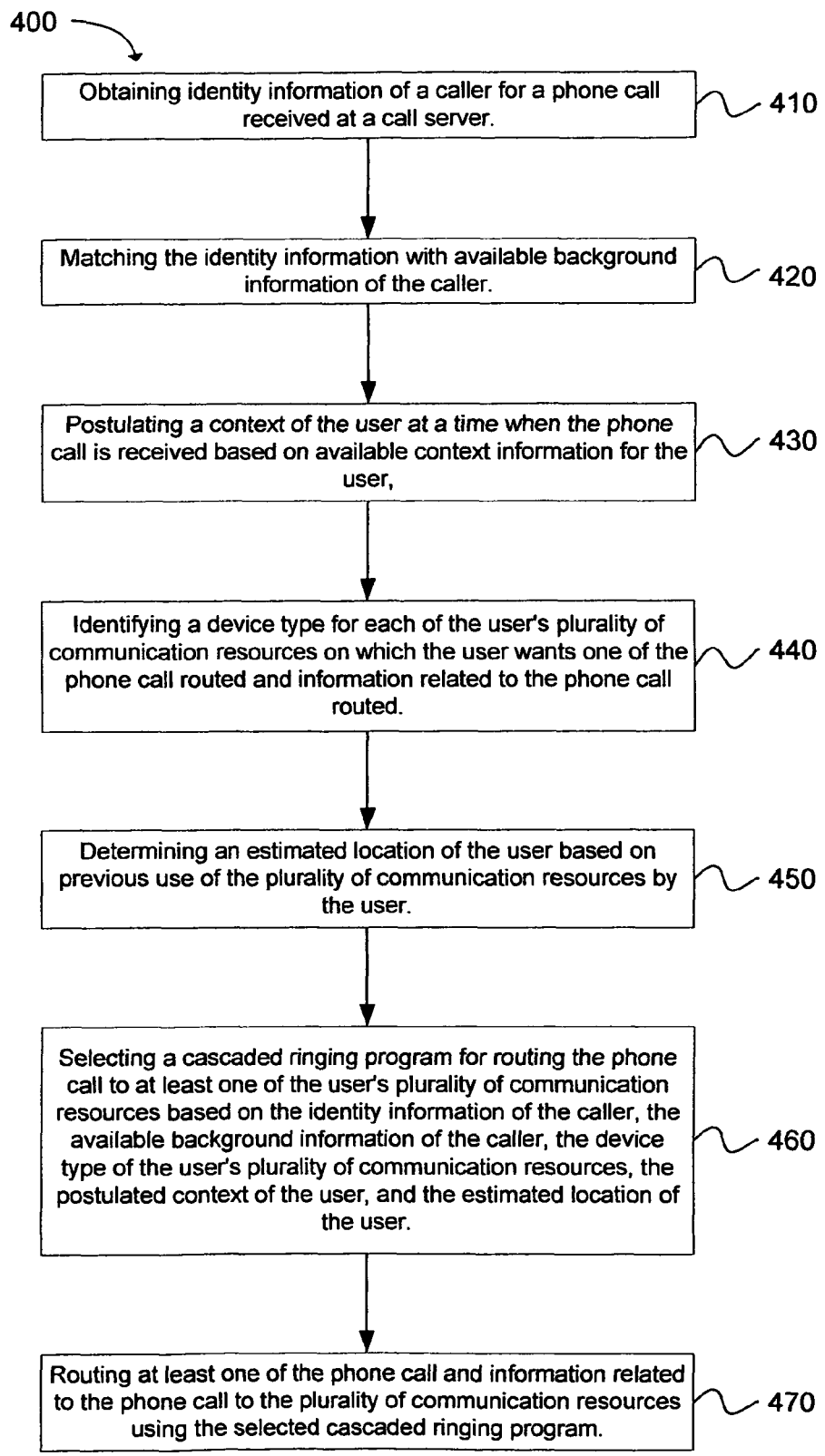
FIG. 4 depicts a flow chart for a method for routing selected phone calls to a user having a plurality of communication resources in accordance with an embodiment of the present invention.

The execution policy module 236 is configured to execute the cascaded ringing program 232 selected by the selection rules module 234. One example of a block diagram for the execution policy is provided in FIG. 3. The block diagram is illustrated in two modules. The Routing Logic module 302 has access to the user metadata and call contextual information. The routing logic module will provide the metadata described communication resources, announcements, and so forth to the selected resources. The routing logic module is provided with one or more connection agents 304 which can mediate these connections using the proper protocols. The agents are connected to suitable networks to find appropriate servers to provide services such as instant messaging, email, making phone calls, and so forth. For example, one agent may be a text-to-speech-converter (TTS) that can receive a message or announcement from the routing logic module 302 and communicate the message or announcement to the PBX. Additional agents may include social media agents to communicate with Facebook™, Twitter™, and so forth.

Various embodiments of the execution policy module 236 (FIG. 2) have been previously described. One of these is the "One_Busy_All_Busy" functionality in which the routing of the phone call is suppressed on all of the user's communication resources if a busy indication is detected on one of the user's unshared resources. The execution policy module will perform this function.

Another embodiment of the execution policy module 236 is device equivalence. This is controlled by the Location metadata attribute. For devices that are indicated as "user" in the metadata module 238 or are located in the same location, the phone call will be routed to only one of these devices for any particular fork.

The execution policy module is also responsible for making sure that execution follows the indications of the Location_Suppress and Suppress metadata attributes that have been described above.

Management

The management module 210 can include a management interface. This will allow both users and system management functions to create, delete, and modify ringing programs and selection policies. A logging system can also be used to record data about program usage. This may be in the form of simple network management protocol (SNMP) data.

While a plurality of modules are shown in FIG. 2, it should not be assumed that each of the modules are required for the operation of a system for routing selected phone calls to a user having a plurality of communication resources. The actual number of modules used in routing a selected phone call is dependent on the design criteria of the system and the needs of the user.

In another embodiment, a method 400 for routing selected phone calls to a user having a plurality of communication resources is disclosed. The method includes the operation of obtaining 410 identity information of a caller for a phone call received at a call server. The identity information can be matched 420 with available background information of the caller. A context of the user can be postulated 430 at the time when the phone call is received. The context can be postulated based on available context information for the user. The device type is identified 440 for each of the user's plurality of communication resources, on which the user wants the phone call or information related to the phone call routed. An estimated location of the user can be identified 450 based on previous use of the plurality of communication resources by the user. A cascaded ringing program for routing the phone call to at least one of the user's plurality of communication resources is selected 460. The cascaded ringing program can be selected based on at least one of the identity information of the caller, the available background information of the caller, the device type of the user's plurality of communication resources, the postulated context of the user, and the estimated location of the user. The phone call and/or information related to the phone call is then routed 470 to the plurality of communication resources using the selected cascaded ringing program.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for routing selected phone calls to a user having a plurality of communication resources, comprising:
    at least one processor;
    a call server configured to obtain identity information for a phone call received at the call server;
    a selection policy module comprising software for execution by said at least one processor and configured to select a cascaded ringing program for routing the phone call to at least one of the user's plurality of communication resources based on the identity information of the caller; and
    a routing module comprising software for execution by said at least one processor and configured to route at least one of the phone call and the identity information to at least one of the user's plurality of communication resources using the selected cascaded ringing program,
    wherein the selection policy module is configured to route at least one of the phone call and information related to the phone call to a single communication resource at a user location when it is determined that multiple communication resources are located at the user location based on information from at least one of the postulated context of the user, the estimated location of the user, and attribute settings of a location attribute, and a location suppress attribute.

2. The system of claim 1, further comprising at least one of:
    a caller identity module configured to match the identity information with available background information of a caller placing the phone call;
    a context module configured to postulate a context in which the phone call will be received by the user, wherein the context is postulated based on available user context information;
    a device type module, configured to store a device type and a contact protocol for each of the users plurality of communication resources on which the user wants the phone call routed; and
    a location module configured to determine an estimated location of the user based on previous use of the plurality of communication resources;
    wherein the selection policy module is further configured to select the cascaded ringing program for routing the phone call to at least one of the user's plurality of communication resources based on at least one of the identity information of the caller, the available background information of the caller, the device type of the user's plurality of communication resources, the postulated context of the user, and the estimated location of the user.

3. The system of claim 1, wherein the cascaded ringing program includes a plurality of forks, wherein at least one of the phone call and information related to the phone call is routed to at least one of the plurality of communication resources at each of the plurality of forks.

4. The system of claim 2, wherein the context module is configured to postulate the context of the user through near-real-time access to the user's calendar information.

5. The system of claim 2, wherein the context module is configured to obtain priority information for the caller from the background information, the priority information relating to an importance of the caller, wherein the priority information is used by the selection policy module to select the cascaded ringing program based on the priority of the caller.

6. The system of claim 1, wherein the plurality of communication resources is selected from the group consisting of an office phone, a home phone, a cell phone, an assistant phone, a coworker phone, an external hot desk connection, a voice mail box, an email account, an instant messaging account, and a social networking account.

7. The system of claim 1, further comprising a metadata module configured to store information about the user's communication resources to allow at least one of the phone call and information related to the phone call to be routed to at least one of the user's communication resources using the information.

8. The system of claim 7, wherein the metadata module contains attributes set for the user's plurality of communication resources, the attributes selected from the group consisting of a mobility attribute to identify a fixed vs. mobile communication resource, a location attribute to identify a location of the communication resource, a location suppress attribute to identify communication resources desired to be activated independent of the communication resource's location, and a suppress attribute to turn off routing of the phone call to selected communication resources.

9. The system of claim 1, wherein the location module is further configured to determine a location of each of the plurality of communication resources.

10. A method for routing selected phone calls to a user having a plurality of communication resources, comprising:
    obtaining identity information of a caller for a phone call received at a call server;
    selecting a cascaded ringing program for routing the phone call to at least one of the user's plurality of communication resources based on the identity information of the caller;
    routing, by a routing module comprising software executed by at least one processor, at least one of the phone call and information related to the phone call to the plurality of communication resources using the selected cascaded ringing program; and
    formatting a cascaded ringing program to route at least one of the phone call and the information related to the phone call to a single communication resource at a user location when it is determined that multiple communication resources are located at the user location.

11. The method of claim 10, further comprising:
    matching the identity information with available background information of the caller;
    identifying a device type for each of the user's plurality of communication resources on which the user wants one of the phone call routed and information related to the phone call routed;
    determining an estimated location of the user based on previous use of the plurality of communication resources by the user;
    selecting the cascaded ringing program for routing the phone call to at least one of the users plurality of communication resources based on at least one of the identity information of the caller, the available background information of the caller, and the device type of the user's plurality of communication resources; and
    routing at least one of the phone call and the information related to the phone call to the plurality of communication resources using the selected cascaded ringing program.

12. The method of claim 11, further comprising postulating a context of the user at a time when the phone call is received based on available context information for the user and selecting the cascaded ringing program based on the postulated context of the user, wherein the postulated context of the user is based on near-real time information obtained from the user's calendar information.

13. The method of claim 11, wherein identifying the device type further comprises storing metadata information related to the plurality of communication resources in a database, wherein the cascaded ringing program uses the metadata to route at least one of the phone call and the information related to the phone call.

14. The method of claim 11, further comprising obtaining priority information for the caller from the background information, the priority information relating to an importance of the caller, wherein the priority information is used to select the cascaded ringing program based on the priority of the caller.

15. The method of claim 10, further comprising formatting a cascaded ringing program to include a one busy all busy attribute to disable routing to all communication resources but the communication resource in use by the user at a time a phone call is received.

16. A method for routing selected phone calls to a user having a plurality of communication resources, comprising:
  obtaining identity information of a caller for a phone call received at a call server;
  identifying a device type for each of the user's plurality of communication resources on which the user wants one of the phone call routed and information related to the phone call routed;
  determining an estimated location of the user based on previous use of the plurality of communication resources by the user;
  identifying a location of each of the user's plurality of communication resources on which the user wants one of the phone call routed and information related to the phone call routed;
  selecting a cascaded ringing program for routing the phone call to at least one of the user's plurality of communication resources based on the identity information of the caller, the estimated location of the user, and the location of the user's plurality of communication devices; and
  routing at least one of the phone call and the information related to the phone call to a single communication resource at a user location when it is determined that multiple communication resources are located at the user location.

17. The method of claim 16, further comprises determining the estimated location of the user based on the user's external hot desk connection.

18. The method of claim 16, further comprising:
  postulating a context of the user at a time when the phone call is received based on available context information for the user; and
  selecting the cascaded ringing program for routing the phone call to at least one of the user's plurality of communication resources based on the user's postulated context.

* * * * *